(12) United States Patent
Karterman

(10) Patent No.: US 6,903,874 B1
(45) Date of Patent: Jun. 7, 2005

(54) INTERACTIVE AUDIO AND VISUAL DISPLAY

(76) Inventor: Don S. Karterman, 675 Birch St., Anchorage, AK (US) 99501

(*) Notice: Subject to any disclaimer, the term of this patent is extended or adjusted under 35 U.S.C. 154(b) by 0 days.

(21) Appl. No.: 10/631,518

(22) Filed: Jul. 30, 2003

(51) Int. Cl.$^7$ ............................................. G02B 27/10
(52) U.S. Cl. ..................................... 359/626; 359/619
(58) Field of Search .................................. 359/619, 626, 359/802

(56) References Cited

U.S. PATENT DOCUMENTS

| | | | |
|---|---|---|---|
| 4,034,555 A | | 7/1977 | Rosenthal |
| 4,475,661 A | * | 10/1984 | Griffin ........................ 215/366 |
| 4,542,958 A | * | 9/1985 | Young ......................... 359/627 |
| 5,494,445 A | | 2/1996 | Sekiguchi et al. |
| 5,642,226 A | * | 6/1997 | Rosenthal .................... 359/619 |
| 5,695,346 A | | 12/1997 | Sekiguchi et al. |
| 5,850,913 A | | 12/1998 | Fantone et al. |
| 5,893,453 A | * | 4/1999 | Ishikawa ..................... 206/232 |
| 5,896,686 A | | 4/1999 | Howes |
| 6,065,623 A | * | 5/2000 | Hierzer et al. ............... 215/230 |
| 6,078,424 A | * | 6/2000 | Morton ........................ 359/463 |
| 6,463,012 B1 | * | 10/2002 | Bar-Yona ...................... 368/80 |
| 2004/0051952 A1 | * | 3/2004 | Raymond .................... 359/619 |

* cited by examiner

*Primary Examiner*—Ricky Mack
(74) *Attorney, Agent, or Firm*—Gregory J. Nelson

(57) ABSTRACT

A lenticular display in association with a consumer article such as a beverage container positioned with respect to the container so that a series of images are presented to the user as the article is used in its normal manner such as when the user is engaged in drinking. The images may be accompanied by a synchronized audio message. In other embodiments, the image may be illuminated and may impart motion.

18 Claims, 9 Drawing Sheets

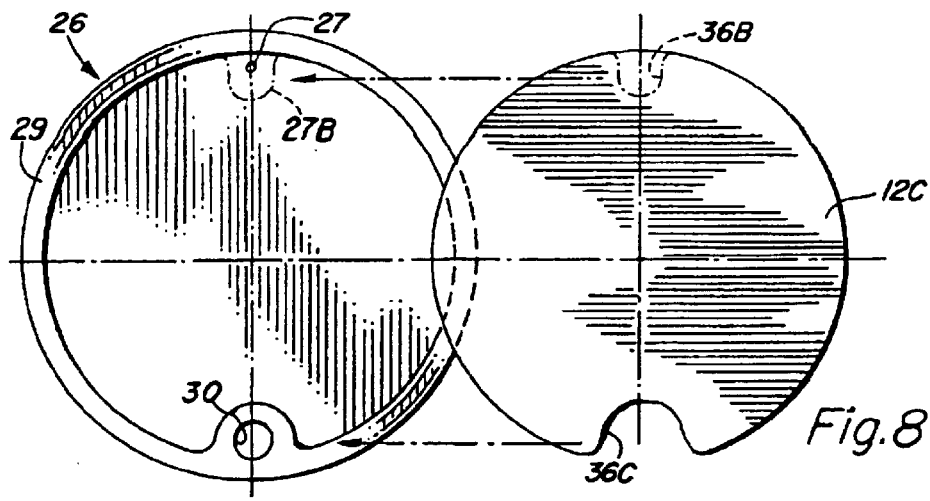
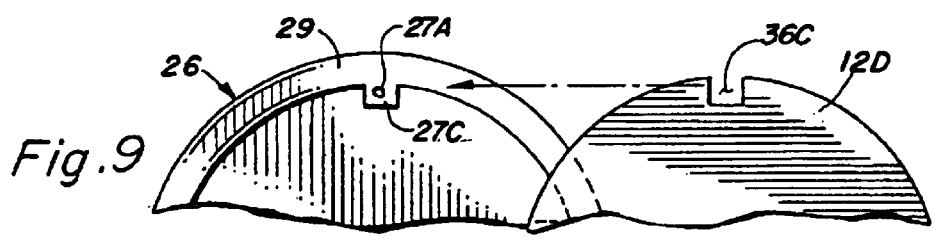
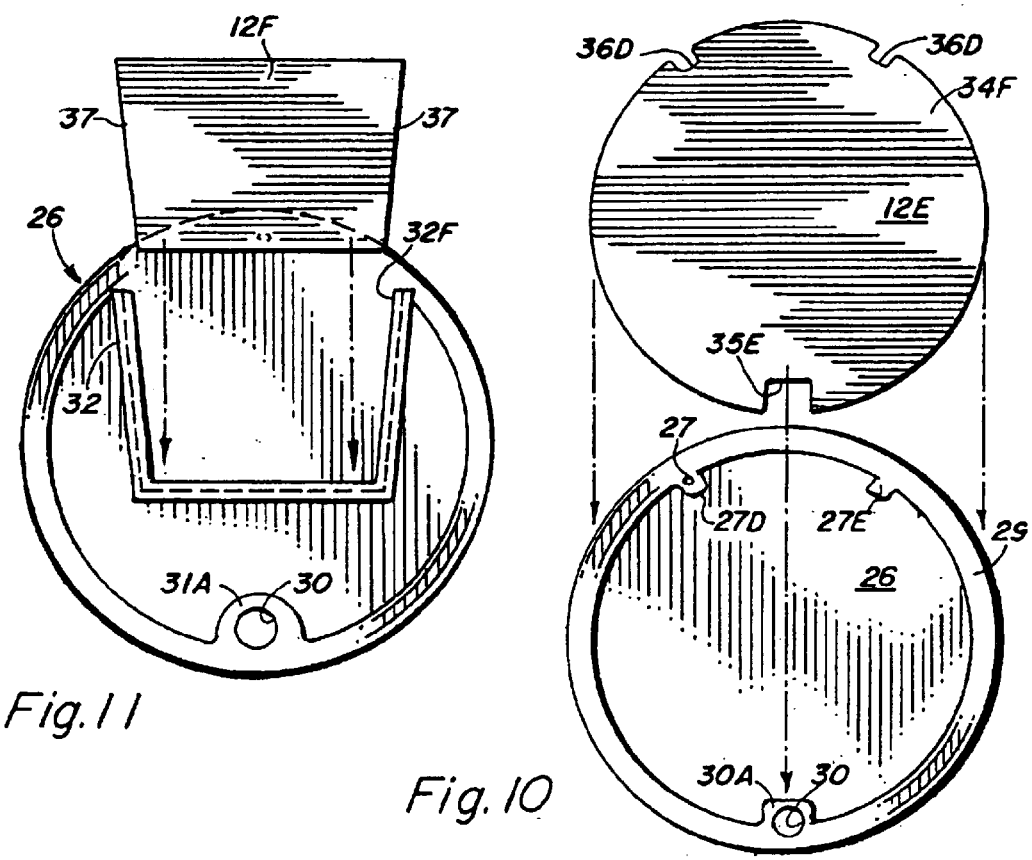
Fig. 8
Fig. 9
Fig. 11
Fig. 10

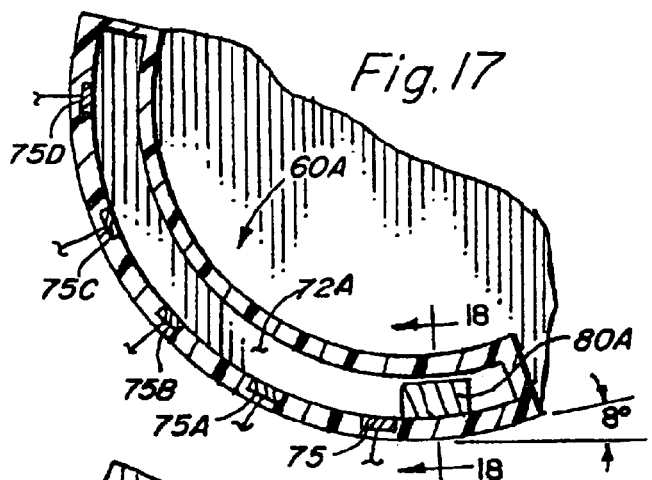
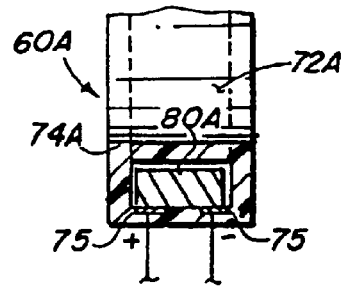
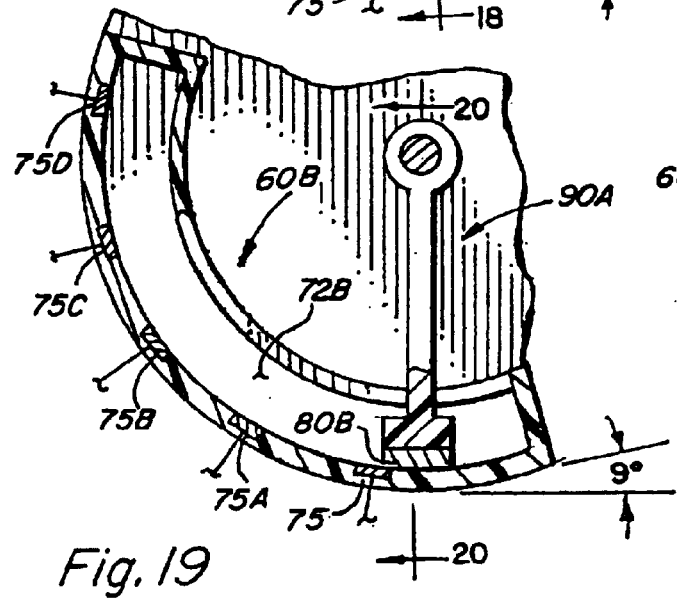
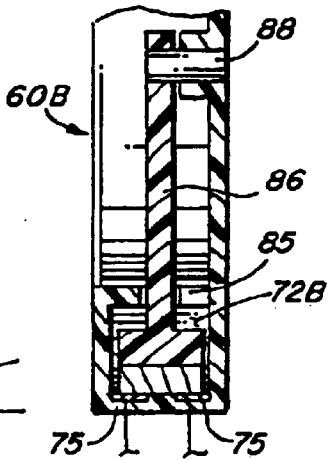
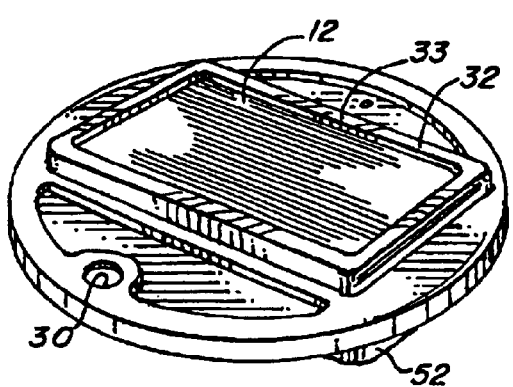
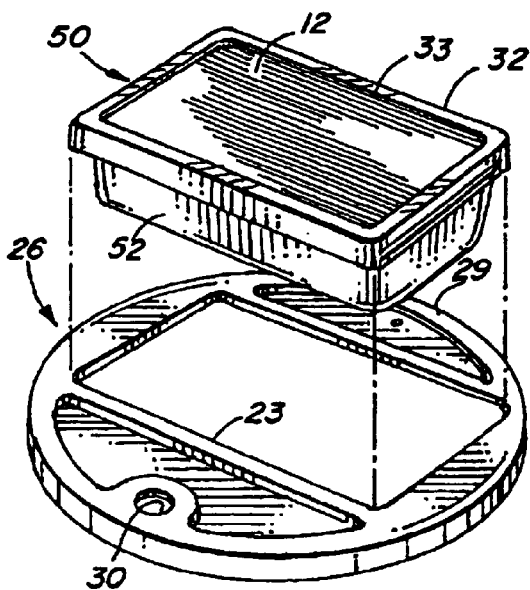

INTERACTIVE AUDIO AND VISUAL DISPLAY

FIELD OF THE INVENTION

The present invention generally relates to interactive visual displays and, more particularly, relates to a display having a lenticular optical component by which graphic images may be viewed, which displays are applied to various consumer items such as drinking cups. The visual displays are activated and the images viewable during the course of normal use of the consumer item and may be accompanied by an audio output, light and vibration synchronized with the visual display.

BACKGROUND OF THE INVENTION

Lenticular lenses are well known and are used to produce various optical effects. Such lenses generally comprise a transparent sheet having a planar surface on one side and a series of parallel longitudinal ridges on the other. The series of parallel longitudinal ridges create a corresponding series of lenticular convex lenses termed "lenticules." An image sheet mounted on the planar surface includes at least two alternate series of spaced lines and images with each of the alternating series comprising a separate master image. The alternate images are optically related to the lenticules so as to be sequentially viewable upon change of viewing position of the lens. Thus, in one viewing position, one master image is visible and moving the lens assembly to a second viewing position brings a second master image into view. As many as 20 or more images may be incorporated into a lenticular lens assembly and different effects such as morphing, flipping, motion and even 3-D conversions can be achieved using this type of lens.

Various patents can be found in the prior art which relate to lenticular optical systems. As an example, U.S. Pat. No. 5,642,226 entitled "Lenticular Optical System" discloses a container having a lenticular area located on the wall of the container.

U.S. Pat. No. 5,850,913 discloses the use of lenticular panels with inserts to impart information to the consumer on containers such as CDs and jewel boxes.

U.S. Pat. No. 5,494,445 entitled "Process and Display With Moveable Images" discloses numerous displays which may utilize lenticular lenses to give the illusion of animation as the sight angle changes.

U.S. Pat. No. 4,034,555 entitled "Lenticular Optical System" discloses a lenticular lens system for a watch and the patentee suggests the system could be used on toys or jewelry.

U.S. Pat. No. 5,896,686 entitled "Multi-Image Prize Award and Method Therefore" discloses a lenticular lens for use as a label on the lid of a beverage container such as a bottle cap.

U.S. Pat. No. 5,695,346 entitled "Process and Display With Moveable Images" also discloses the use of a lenticular lens in a variety of lens including on beverage containers.

Thus, from the foregoing, it is seen that lenticular devices have been applied to various consumer products such as beverage containers. However, simply placing a lenticular device on a side of a beverage container makes it impossible for the user to view the visual display while drinking from the container. While placement of a lenticular label on the side of the beverage container may allow a nearby observer to observe the display, such viewing is, at best, ineffective as the user may not view the label when drinking and individuals adjacent the user will not generally be able to see the label because of viewing angle restrictions, obstructions and the small size. Further application of these type lenses to a container in the form of a label, does not provide a display which is viewable to the user and such application does not change or present multiple images as the user is engaged in the normal use of the article such as drinking from a container.

Accordingly, prior use of lenticular lenses, as suggested by the above patents, basically apply lenses as labels as a substitute for printed matter. On posters, clocks, books, and the like, lenses have been used as decals or labels to attract an individual passing by. Other uses include use on cards, primarily for promotional and advertising applications. The user tilts the card back and forth while holding it to observe the images.

Therefore, it is a broad object of the present invention to provide an interactive visual display incorporating a lenticular lens with a consumer object such as a drinking cup. The lenticular display is oriented relative to the user's normal line of sight or viewing angle while using the object associated with the display. The physical motion or movement attendant to normal use of the item will allow the user to simultaneously view a plurality of lenticular images and perhaps also be provided a synchronized audio, light or vibration component. A particular advantage of the present invention is that it may be used as a novelty or promotional media which enhances the use of an item such as increasing the satisfaction derived when drinking a beverage by providing simultaneous visual displays.

The display may include both visual images and an audio track such as an advertising message related to the product being consumed or other products. For example, the lenticular display may display an image of blowing snow and an icy landscape enhancing the enjoyment and creating an advertising message promoting the coldness and freshness of the beverage being consumed. Similarly, an animated scene, such as a volcano erupting with text such as "Get it While It's Hot," may enhance the enjoyment of a hot beverage such as tea or coffee. Images of popular personalities such as athletes and movie stars can also be incorporated to promote the product and create a favorable impression regarding the product brand being consumed.

Lenticular displays of this type may also be incorporated into items which are collector's items. Accordingly, another object of the present is to provide an interactive audio/video display in connection with items which are sought by collectors. Thus, the invention can be used in connection with collector's cards such that the lenticular display may be removed and replaced. The consumer item may be the cover of a beverage container enabling the user to interchange different graphic displays based on a theme or upon a character of a particular story or athletes from a particular team or sport. The invention may comprise a card holder molded to the surface of a lid or cover of an item so that the card holder comprises a viewing window through which the user may observe the lenticular object placed therein. The item may also include a surface which may be three dimensional depicting an object, as for example a school bus with the chassis of the bus being lenticular material depicting an animated scene of children riding the bus. The lid or cover may also take the appearance of a computer monitor or other item.

BRIEF SUMMARY OF THE INVENTION

Briefly, the present invention in one preferred embodiment comprises a holder or receptacle for a lenticular display. The holder or receptacle is attachable to or integrally formed as a component of the lid of a beverage container and is positioned to orient the display in a predetermined position relative to the user. The lid has an orifice or opening from which the user may drink or insert a straw. The display is positioned relative to the orifice so that as the user engages in the normal use of the item, in this case drinking from the container, the display is properly oriented and aligned with respect to the eyes of the viewer so that, as the cup is lifted in an ordinary drinking motion, a series of images will be presented to the user's line of sight. An audio message may also be provided to the user which audio message corresponds or is synchronized with the series of images presented as the user utilizes the device. The audio display may be initiated by a series of contacts or switches which activate a sound circuit to sequential broadcast a phrase such as "Hello, how are you?" keyed to the visual images.

The various embodiments disclosed below disclose other features, applications and advantages of the invention described. Lights or a vibrator may be activated to accompany the images presented.

BRIEF DESCRIPTION OF THE DRAWINGS

The above and other objects and advantages of the present invention will become more apparent from the following, description, claims and drawings in which:

FIG. 8 is a top view of another embodiment;

FIG. 9 is a top partial detail view showing another embodiment of the invention similar to that shown in FIG. 8;

FIG. 10 shows yet another embodiment of the display of the present invention;

FIG. 11 shows yet another embodiment of the invention;

FIG. 17 is a cross-sectional view illustrating yet another embodiment of the audio sequencing mechanism;

FIG. 18 is a cross-sectional view taken along line 18—18 of FIG. 17;

FIG. 19 is a cross-sectional view illustrating yet another embodiment of the audio sequencing mechanism;

FIG. 20 is a cross-sectional view taken along line 20—20 of FIG. 19;

FIG. 21 is a perspective view of a beverage container lid incorporating yet another embodiment of the lenticular visual imaging components;

FIG. 22 is a perspective view of the embodiment of FIG. 21 showing the visual imaging component detached from the drinking lid;

DETAILED DESCRIPTION OF THE DRAWINGS

Turning now to the drawings, various embodiments of the present invention are shown throughout the various views. For convenience, like numerals have been used to designate the same or similar elements throughout the various views. As set forth above, the present invention relates to a visual display device or a visual display device in combination with an audio device which may be used with conventional consumer items. When the consumer items are used in their normal fashion, such as drinking a beverage from a cup, a graphic image, or a series of graphic images which may be accompanied by coordinated sound are viewable by the user.

Figure 1:
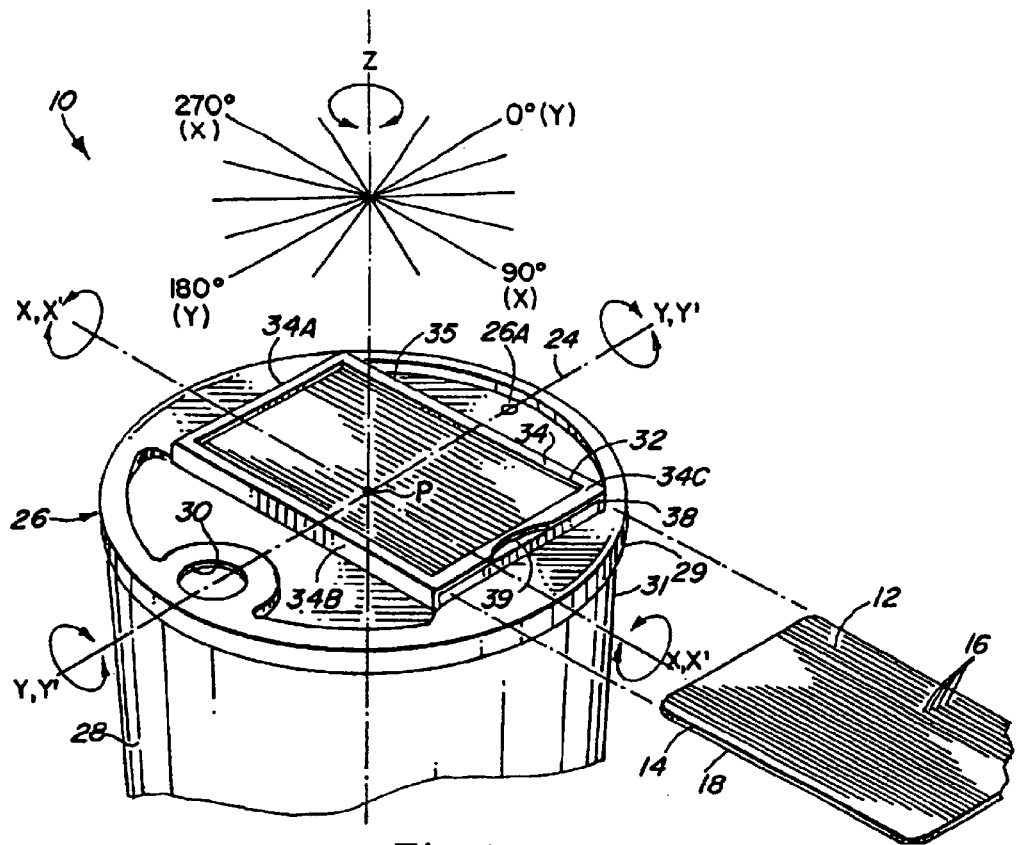
FIG. 1 is a perspective view showing the top of a consumer item shown as a beverage container with the associated lenticular visual display.
Figure 2:
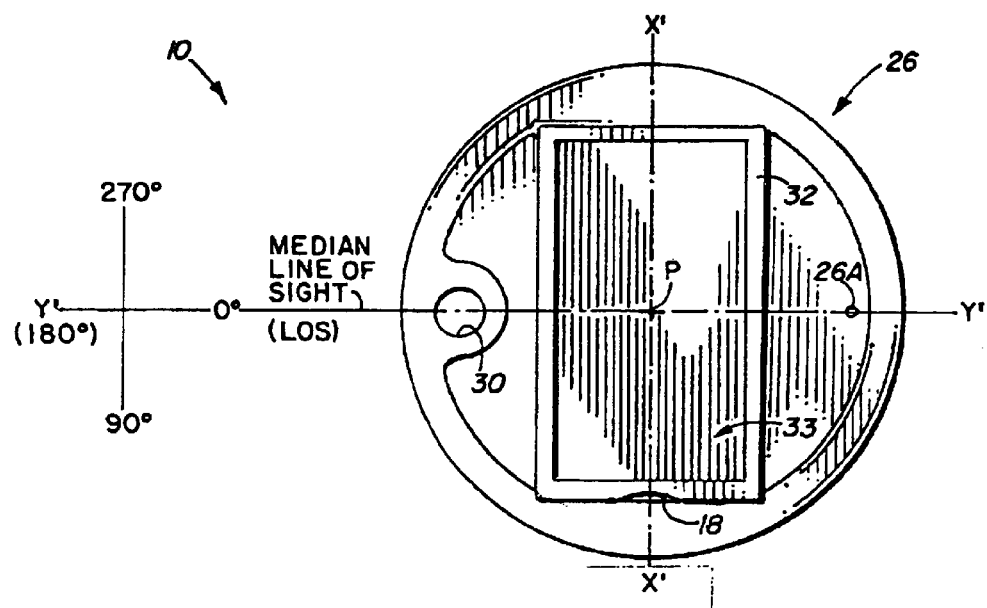
FIG. 2 is a top view of the container of FIG. 1.
Figure 3:
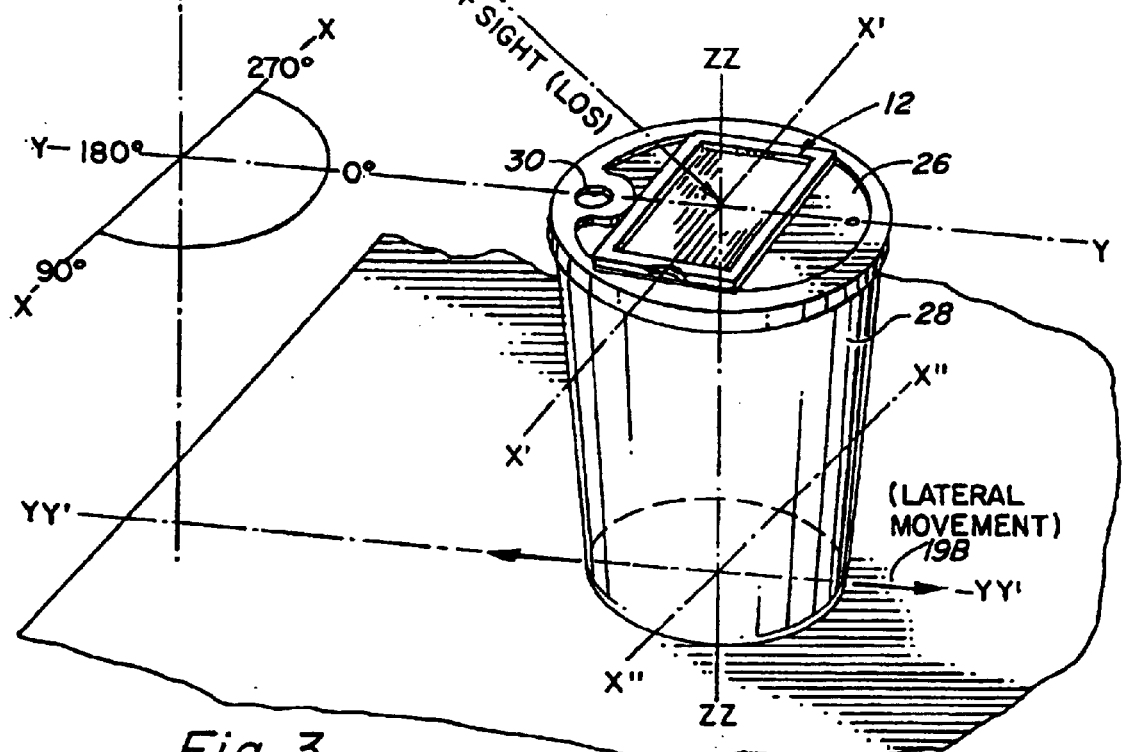
FIG. 3 is perspective view of the container indicating the user's line of sight with reference axes.

An embodiment of the display device of the present invention is shown in FIGS. 1 to 3 and is generally designated by the numeral 10 and is shown in conjunction with a lid 26 of a beverage container 28. The lid or cover of such containers are generally fabricated from plastic and have a raised, peripheral extending lip 29 which engages the upper edge 31 of the cup and is frictionally retained in place. An aperture or opening 30 is provided in the lid, usually displaced from the center of the lid, so that the user may access the contents by placing a straw through the opening 30 or placing the opening to the user's mouth.

The interactive visual display 10 is shown as having a lenticular lens assembly 12 generally having a transparent sheet 14 having a planar surface on one side and a series of parallel longitudinal convex lenses 16 termed "lenticules." A print sheet 11 mounted on a planar surface includes at least two image frames although generally more than two will be provided. The frames are alternatively or sequentially visible upon changes in the viewing position of the lens and may display various types of effects available with lenticular technology. Thus, at one viewing position, one master image is visible whereas moving the lens assembly 12 to a second position brings a second image into view and so on. As is well known in lenticular lens technology, multiple displays, as many as 20 or more, may be provided so that the lenticular effect results in frames being sequentially displayed to the user. Displays may vary depending upon the particular application and may present a sequence advertising a message for a product. The sequence may be images for reinforcing or promoting the enhancement or enjoyment of the product being consumed or may be any suitable image. Reference is made to U.S. Pat. No. 5,695,346 and patents cited therein for a discussion of lenticular technology which technology is well known to those in the art, it not being necessary to reiterate the details of this technology. Also, lenticular lenses are commercially available from numerous sources such as MIRAGE WORKS. The term "lenticular lens," as used herein, includes lenticular material in any shape: round, square or rectangular and of any suitable material such as acrylic, styrene or PVC. The term also applies to such material having various lenticular effects including, but not limited to morphing, flipping, phasing, zooming and three-dimensional which may require special viewing glasses.

The lens assembly is removably received within a holder 32 which is either attached to or formed as an integral part of the lid 26. The holder has four sides, 34, 34A, 34B and 34C, forming a rectangular frame having an inwardly depending flange 35 which defines a viewing area 33 with the planar surface of the lid. A slot 38 is formed in side 34C being dimensioned to allow the lenticular assembly 12 to be inserted into the viewing area 33 of the frame. A recess 39 may be provided in the flange to facilitate access to the display when inserted so that it may be more easily removed.

For purposes of description and understanding the invention, axes XX, YY and ZZ are shown in FIGS. 1, 2 and 3. These axes are shown for purposes of orientation relating to the use of the display device mounted on the top of the lid of the beverage container.

Axis ZZ is a vertical axis aligned with the vertical centerline of the container. It will be noted that when the lenticular display device 12 is in the holder it is centrally positioned with respect to the lid. Axis XX and YY extend perpendicular to one another and all axes intersect at a common point P as best seen in FIGS. 1 and 2. The median line of sight (LOS) is represented by a line extending from the representation of the user's eye to the top surface of the lenticular display.

In the normal course of drinking, the user will grasp the container 28 and normally move it in a lateral direction along axis YY, also moving it upwardly towards the user's mouth. At the same time, the user will cause the container 28 to tilt generally about the XX axis. These motions will bring a frame or image on the display within the line of sight (LOS). As the drinking procedure continues and the container is further rotated about the XX axis, additional images will be brought into the user's view as the cup and lens assembly are tilted. As indicated above, the series of frames or display may be in the form of a greeting message such as "Hello, how are you?" or a series of images or slogans to promote a product or enhance the consumption of the product. It is important that the opening or aperture 30 through which the contents of the container are accessed is located along the YY axis displaced from point P which will properly position the lens assembly in a proper viewing position. The use of the display will be further described below with respect to FIGS. 7 to 7D.

Figure 4:
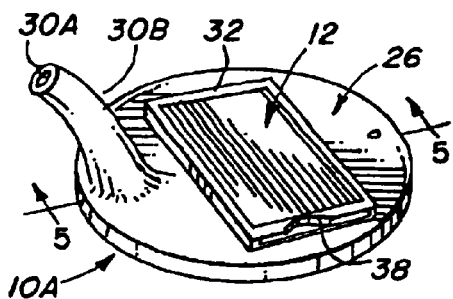
FIG. 4 is perspective view of another embodiment of a container lid of the present invention incorporating the display.

FIG. 4 illustrates an alternate embodiment of the present invention generally designated by the numeral 10A which, again, is associated with a lid 26 of a beverage container. The lid carries a frame 32 having a slot 38 for removably receiving the display assembly 12. The orientation of the card-shaped lens assembly, relative to the liquid dispensing aperture 30, is as has been described previously. However, in this embodiment the liquid dispensing aperture is a passageway 30A in an integrally formed drinking tube 30B extending upwardly from the lid toward the user. In other respects, this embodiment is as has been described above.

Figure 5:
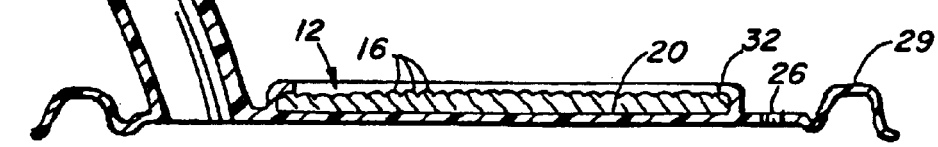
FIG. 5 is a sectional view taken along 5—5 of FIG. 4.

FIG. 5 is a cross-sectional view of the embodiment of FIG. 4 which illustrates the frame 32 which receives the lenticular display 12 having a planar surface 20 and a series of parallel ridges, which create a plurality of lenticular convex lenses 16. A print sheet 18 is mounted on the surface and incorporates a series of images. The annular rim 29 of the lid 26 which engages the upper lip 31 of the cup is also shown and is the same or similar to that of FIG. 1.

Figure 6:
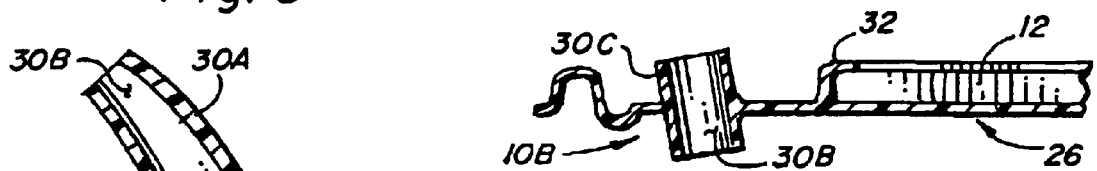
FIG. 6 is a sectional view similar to FIG. 5 showing an alternate embodiment of a container lid to which the display is applied.

FIG. 6 is an embodiment 101B similar to FIG. 5 in which the lid 26 is again provided with a holder 32 for receivably receiving the lenticular display 12. The drinking aperture is defined by a cylindrical sleeve 30B extending through the upper surface of the lid spaced from the holder as described above. The cylindrical sleeve has an aperture 30C for insertion and retention of a drinking straw or the beverage may be consumed by placing the sleeve 30C to the user's mouth. The use of a straw will also place the straw in alignment with the YY axis due to its orientation and length. The sleeve will retain the straw to prevent it from wiggling out of alignment.

Figure 7:
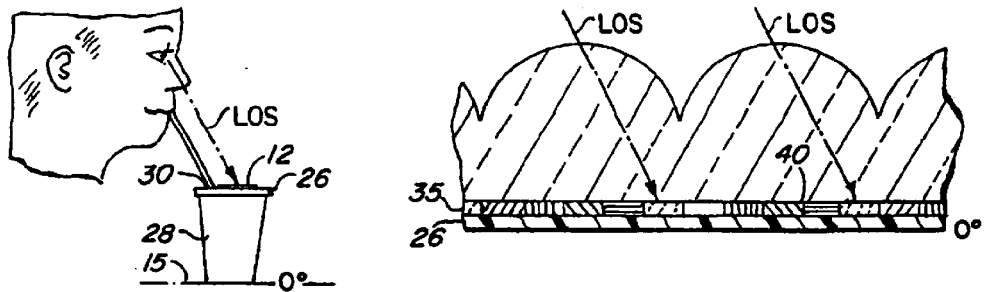
FIGS. 7 through 7D illustrate the visualization sequence which occurs as a user is engaged in the act of drinking from a container provided with a lenticular display according to the present invention.
Figure 7A:
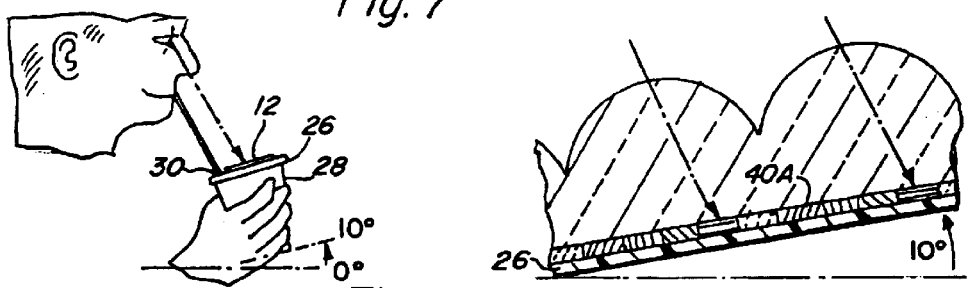
Figure 7B:
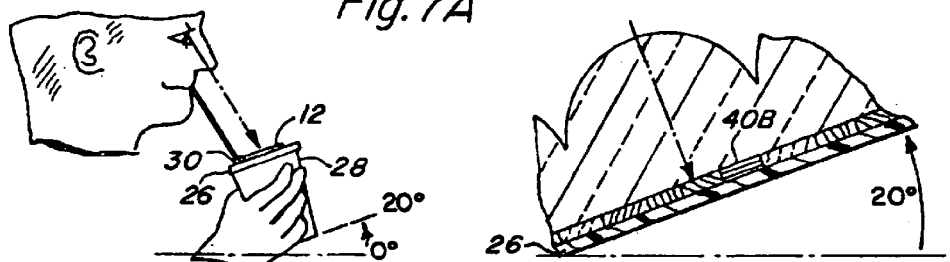
Figure 7C:
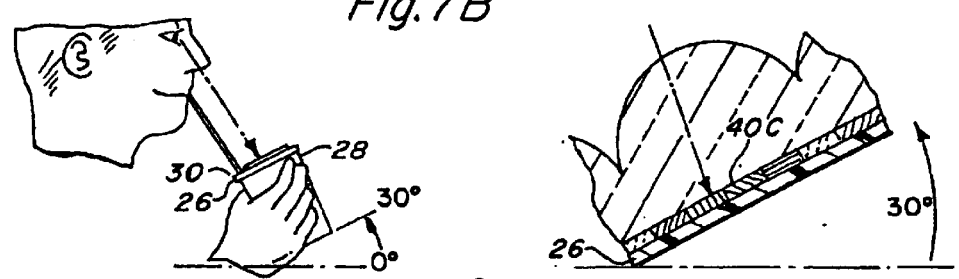
Figure 7D:
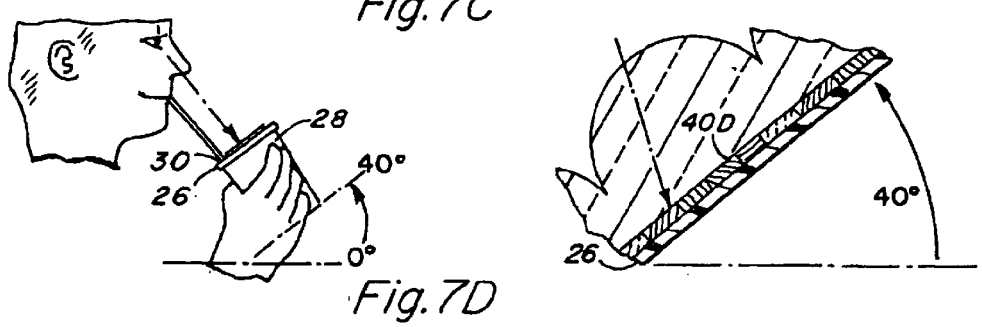

FIGS. 7 to 7D further illustrate the use of the invention in conjunction with a beverage container from which the user is drinking using a straw. The illustrations 7–7D apply to use of the various embodiments described herein. An advantage of using a straw in conjunction with the present invention when applied to a beverage container is that a straw increases the focal distance of the display from the observer along the LOS when the image display is mounted on the lid or cover of a beverage container. Thus, when a user places the end of the straw in his or her mouth, the increased focal distance will make viewing of the image on the display 12 easier, reducing eye strain. Further, plastics and inks used to create the graphic images may not be food grade, thus the use of a straw will enable the user to view the graphics without having to physically place his or her mouth directly on the lid or the display. As the container is rotated, various images designated 40, 40A, 40B, 40C and 40D are sequentially aligned with the LOS and presented to the eyes of the user which images will change as the cup is rotated from 0° to 40°.

In FIG. 7, the container 28 is shown positioned on a flat surface. In FIG. 7A, the user has grasped the container 28 and has begun to tilt it upward. The user is, by functional necessity, positioned centrally in relation to the aperture 30 in the lid 26. This orientation is critical as to the placement alignment of the display 12 and the alignment of the aperture 30 along the YY axis will properly orient the user's eyes with respect to the display. As the user continues to tilt the container, a sequence of images will be displayed to the user. In FIG. 7A, the container 28 is shown tilted about 10° displaying a first image. FIGS. 7B, 7C and 7D, show the container being further tilted and, in each case, the focal angle changes presenting a different image display. As pointed out above, the sequential display can be a scene, advertising message or slogan which will enhance the experience of consuming the beverage.

In FIG. 8, a plan view of a lid 26 of a beverage container is shown having an aperture 30 for consumption of the beverage by drinking directly through the aperture or by inserting a straw and has vent opening 27. A lip 29 extends around the edge of the cup and also around the drinking aperture. The display 12C is shown as generally being circular having a diameter selected so that it may be placed within the circular lip 29 on the lid of the container. A recess 36C is provided relative to the image to properly orient the display relative to the surface of the lid and the user. The recess 36C is configured to be engaged about the semicircular rim 30A extending about the drinking aperture 30C. Another recess 36B is also provided in the display to align with the vent opening 27. The display 12C can be frictionally engaged against the lid or may be secured with suitable adhesive applied to the bottom surface of the display.

FIG. 9 shows a partial view of a lid 26 of a container similar to that shown in FIG. 8. The lid 26 has a circular rim 29 extending around the edge of the container lid with a projection 27C located diametrically opposite the drinking aperture not shown. The raised projection 27C defines orifice 27A which provides an air vent to facilitate drinking from the container.

The lenticular assembly 12D is part of a display which is oriented with respect to the drinking aperture in the lid so the image or images are displayed along the LOS as the user drinks the contents from the container. A cut-out or notch 36C is provided in the edge of the display to engage projection 27C to properly align the image and also to frictionally engage the display on the lid in a "snap-on" fashion. Displays of this type may be provided to the user at the time a drink is purchased and, for example, may be part of a series of collector items with different images which will allow the user to remove and retain the display in a collection after the drink is consumed.

In FIG. 10, a container lid 26 is again shown as circular and is of the type that can be engaged to the top of a beverage container. The lid has a projection 30A which defines an aperture 30 through which the beverage may be consumed. The aperture is raised above the surface of the lid similar to that shown in FIG. 8 which will assist in avoiding spillage if a beverage is poured through the aperture into the user's mouth when consumed. A generally square projection 27D extends inwardly from the flange and defines an opening 27 which provides an air vent into the container. A second projection 27E, which may be square or circular as shown, is also provided along the cup edge 31.

The image display 12E is circular having a diameter generally conforming to the inner diameter of the rim 29 and may be secured to the lid by engaging the notches 36D about the projections 27D and 27E. This will secure the display 12E in position properly orienting the images lens for viewing when the consumer drinks from the container. The image display 12E may be removed and retained by the user after the beverage has been consumed.

In FIG. 11, the image display 12F is generally trapezoidal in shape having converging sides 37 which are engageable in the similarly configured frame or holder 32. The holder is open at its upper edge 32F to facilitate insertion and removal of the display from the holder associated with the container lid 26.

As discussed above, the visual display of the lens assembly of the present invention can also be accompanied by other sensory outputs such as a synchronized audio output. As seen in FIGS. 12 to 15, 21 and 22, a component of a consumer product, in this case the lid 26 of a beverage container, is again shown. The lid is as has been described above having an annular lip 29 which frictionally engages the upper lip 31 of a beverage container. The upper surface of the lid 26 carries an image display having a lens assembly 12 of the lenticular type which will display one or more images to the user in the course of normal use of the product as the display is rotated. In addition to the visual display, an audio signal output is also provided. The output includes an audio component 50 having a housing 52 which is shown as extending from the underside of the device 10E. The image display 12 and audio output unit 50 may be permanently affixed to the lid 29 but preferably comprise a removable insert associated with an aperture 23 in the lid as shown in FIGS. 21 and 22. This feature allows the user to remove the display and facilitates retention as a collectible item which may be provided to the user either as a complimentary item or one which may be purchased with a product such as a beverage.

Figure 13:
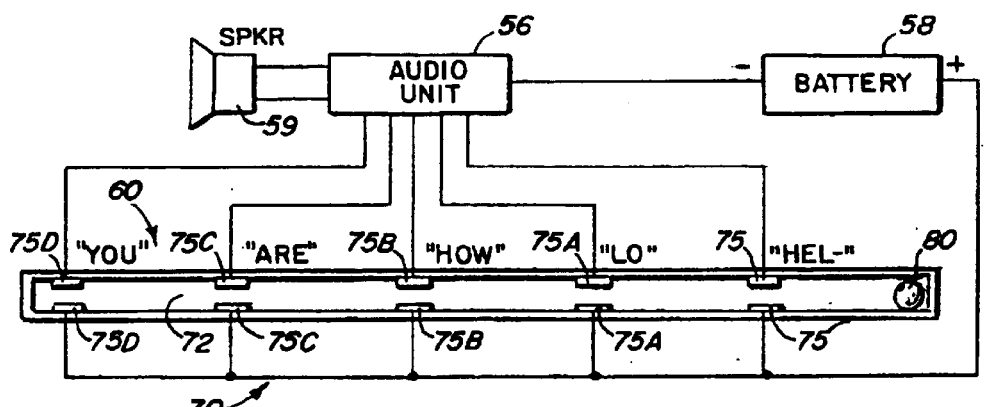
FIG. 13 is a schematic diagram of the audio component shown in FIG. 12.

The audio unit includes an electronic audio circuit 55 of the type which is well known including a battery 58, a digitally programmed chip 56 and an output speaker 59. As best seen in FIG. 13, the audio circuit is connected to the power source across a switch 50 which activates the audio unit to produce an audio output which is synchronized with the visual image presented to the user.

The audio output at the speaker may be an advertising slogan or simple phrase such as "Hello, how are you?" To produce a synchronized audio output, the audio unit is connected across a synchronization control switch 60 is contained within the audio unit. The synchronization switch 60 has segmented arcuate passageway 72 in a housing 74 within the audio housing 52. In the normal, resting position, the switch 70 is in the position shown in FIG. 14. The arcuate passageway 72 extends upwardly, as shown, having a plurality of pairs of spaced-apart contacts 75, 75A, 75B, etc., along its length. A displaceable conductive member 80, shown as a small ball, will move or roll along the channel as the orientation of the channel is changed as the consumer manipulates the associated consumer item, such as a cup, when engaged in the normal activity of drinking.

Figure 14:
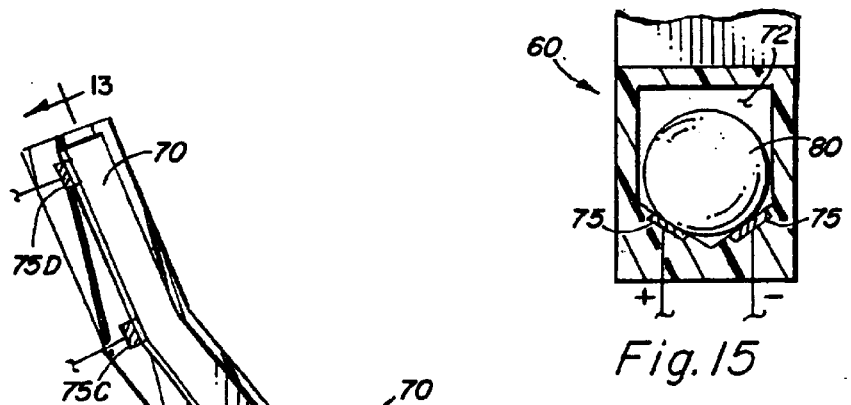
FIG. 14 is a cross-sectional view of the contact assembly for sequentially coordinating the audio signal with the visual display.
Figure 15:
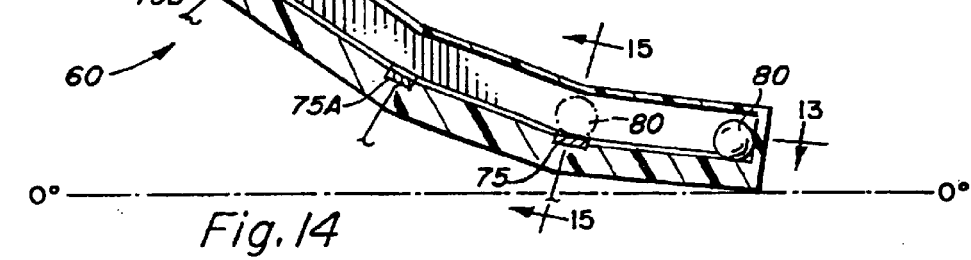
FIG. 15 is a cross-sectional view taken along 15—15 of FIG. 14.
Figure 16:
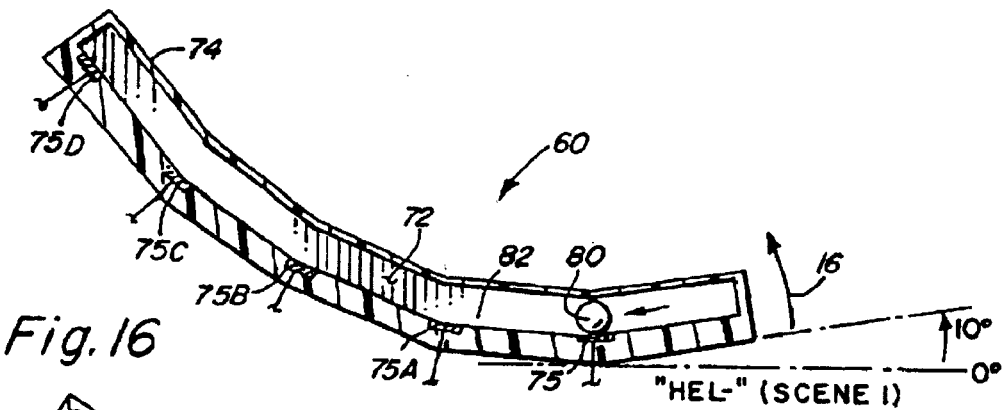
FIGS. 16 through 16D illustrate the audio sequencing that occurs as the beverage container is rotated.
Figure 16A:
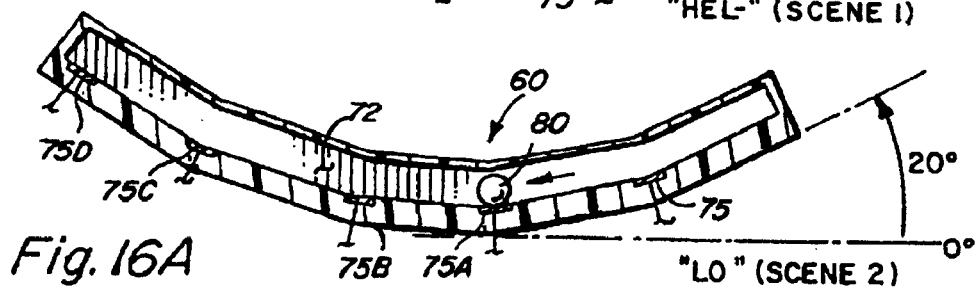
Figure 16B:
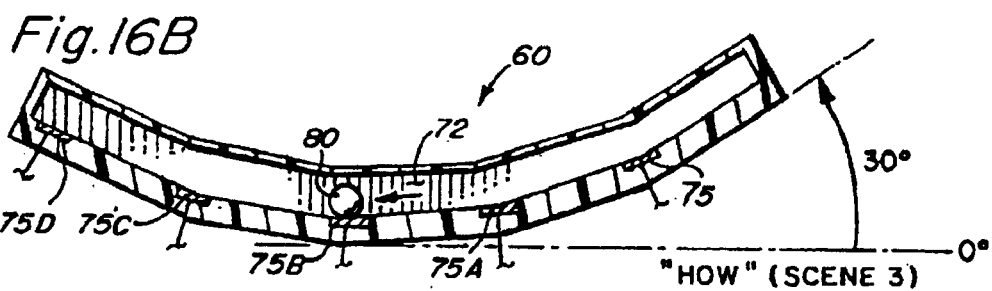
Figure 16C:
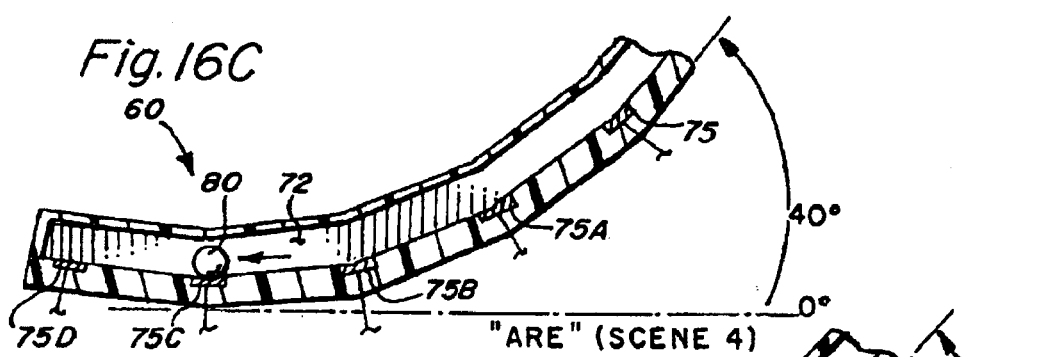
Figure 16D:
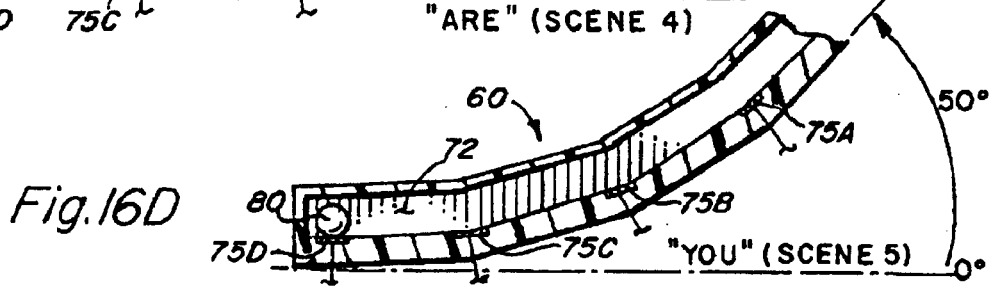

The at rest position is shown in FIG. 14 in which the contact 80 is at the lower end of the channel. As the user raises and tips or inclines the associated cup, the displaceable contact 80 will move from the position shown in FIG. 14 to the position shown in FIG. 16 at which point a circuit will be completed between contacts 75 completing a circuit to emit a first audio output, in this case the first syllable "H-E-L" of the word "Hello." As the drinking activity continues, the synchronized switch will be sequentially rotated to the position shown in FIGS. 16A, 16B, 16C and 16D establishing sequential circuits completing the slogan "Hello, how are you?" as indicated in FIG. 13. Each audio output signal will be synchronized to the image display to the user as both the audio and visual components are positioned dependently. For example, the image might show the face of a celebrity with the person's mouth forming the words of the slogan in each associated image display.

Note that the channel may be provided with small depressions or detents 82 at each of the locations of each pair of contacts so there is a slight hesitation or interruption of the movement of the displaceable contact to activate the appropriate audio component.

Figure 12:
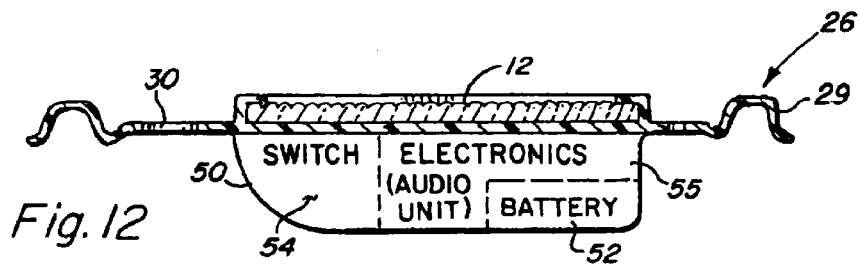
FIG. 12 is a cross-sectional view of a beverage container lid incorporating both a visual display and audio unit.

FIGS. 17 and 18 show yet another embodiment 60A of the synchronization switch which may incorporated into the audio circuit as shown in FIG. 12. Again, the switch 60A has a generally arcuate passageway 72A having a plurality of pairs of spaced-apart contacts 75, 75A, etc. Each pair of contacts, when bridged by a conductor 80A, will complete a circuit between the power source and the audio component to cause the audio component to broadcast a pre-programmed word or phrase. The normal resting or beginning position is shown in FIG. 17. As the consumer item incorporating the invention, such as a beverage cup, is used in the ordinary course of drinking activity, the contact 80A, shown as a small rectangular conductive element, will move along the passageway progressively activating the electronic circuit to emit an audio output synchronized with the image displayed as a result of the user utilizing the consumer product in its normal fashion. As mentioned above, the act of drinking will display a series of lenticular images accompanied by sound which is synchronized with the images presented.

Figure 12A:
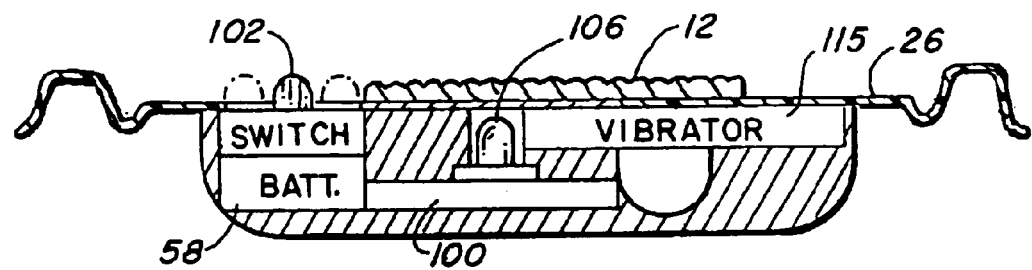
FIG. 12A is an alternative embodiment of an audio device and illumination means.
Figure 28:
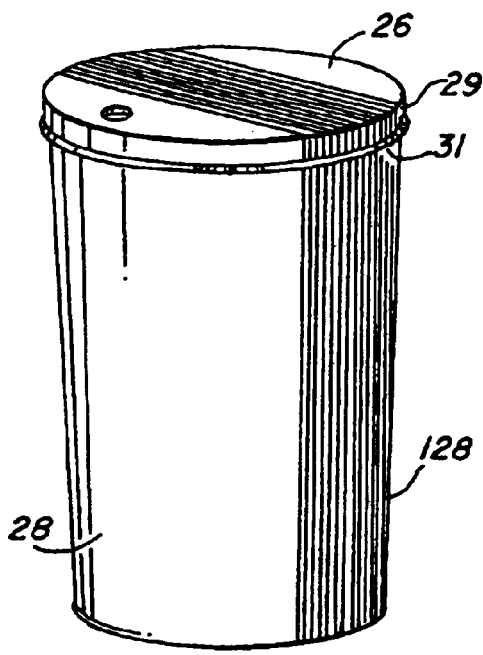
FIG. 28 illustrates yet another embodiment having a lenticular display incorporated in the beverage container lid and an associated cup having a related image thereon.
Figure 29:
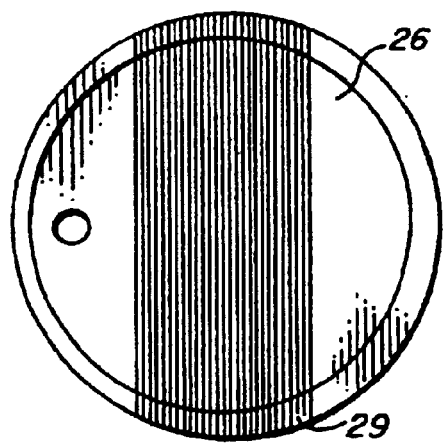
FIG. 29 is a top view of the container lid of FIG. 28.
Figure 30:
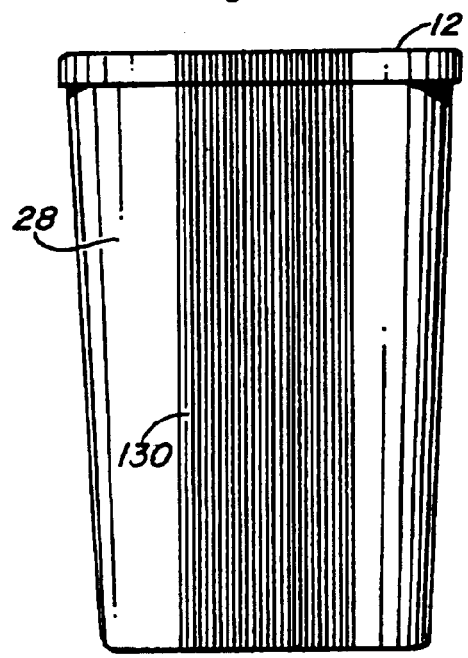
FIG. 30 is a side view of the container and related image display.
Figure 31:
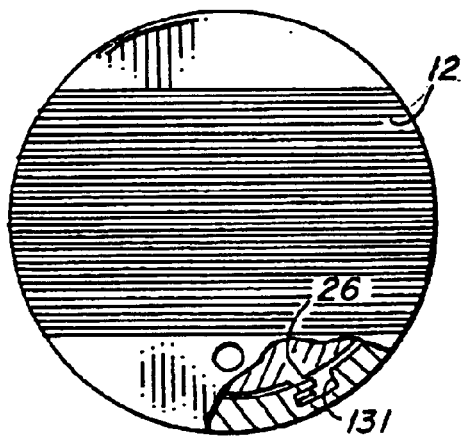
FIG. 31 is a top view of the lid and container of FIGS. 28 to 30 partly broken away to illustrate the lid locking arrangement which places the images on the lid and container in registry.

In addition to sound, other sensory outputs may be provided. Referring to FIG. 12A, the audio section may include a pre-recorded audio chip 100 which is connected in the circuit and which may be activated by a switch 102. The user will activate the audio chip to play by a switch 102. The pre-recorded message will play and the user will attempt to manipulate the cup and associated display in synchronization with the message. For example, the images may be of a pop singer voicing the phrase "How are you?" and the user will attempt to tilt the cup at an angular rate of displacement so the proper images will appear in view corresponding to the audible message.

Also, as seen in FIG. 12A, the image may include illumination such as a small LED 106 which will light or backlight the display 12. The light is powered by the battery 58 and controlled by switch 102.

A small vibrator 115 may also be provided to provide motion and realism to the image such as an image of a volcano. The vibrator of the type commonly used on cell phones will vibrate the image as the image is mounted on a holder on a flexible substrate, such as a cup lid 26.

FIGS. 19 and 20 show yet another embodiment for the synchronization switch 60B, which has an arcuate channel 72B along which are disposed a plurality of pairs of contacts 75, 75A, etc., each connected in the circuitry of the audio component, as seen in FIG. 13. The channel also defines a slot 85 through which depends the arm 86 of a pendulum 90 pivotal about axis 88. The lower end of the pendulum 90 carries a contact member 80B which, as the article such as a cup, is manipulated when drinking, will cause the pendulum 90 to smoothly swing along the passage sequentially in synchronization with the position of the cup and associated image activating an accompanying audio signal to be emitted.

Figure 23:
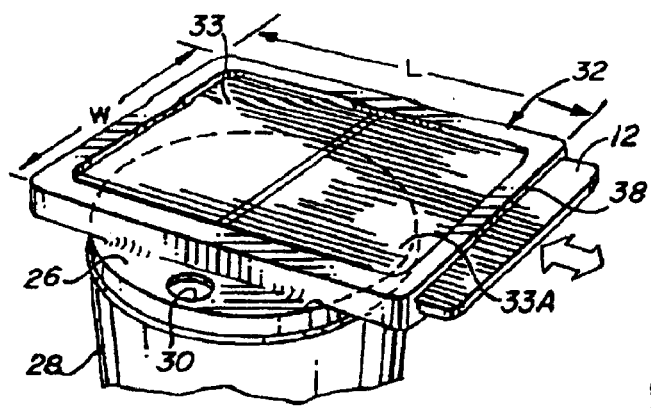
FIG. 23 illustrates yet another embodiment of the present invention in which the lenticular lens frame is oversized.

In FIG. 23, yet another embodiment of the present invention is shown in which the image-bearing lens assembly 12 is removably insertable in a holder 32 either permanently or temporarily secured to a consumer item such as the lid 26 of a beverage container 28. The lid is shown having an aperture 30 through which the consumer can access the contents. The holder 32 is shown as being generally a rectangular frame dimension having a length L and width W greater than the diameter of the lid 26. The frame defines a slot 38 which removably receives the display 12 which is a planar card-like structure, as has been described. The holder is displaced from the fluid aperture 30 and oriented relative to the aperture so that the display is presented to the user as the user is engaged in normal drinking activity. The oversized holder allows a larger image display 12 to be utilized, enhancing the impression presented to the viewer. The holder may be provided with multiple windows, 33 33A and the lenticular lens assembly provided with separate displays alignable with the windows. One of the displays may be a non-lenticular display such as a graphic advertising message.

Figure 24:
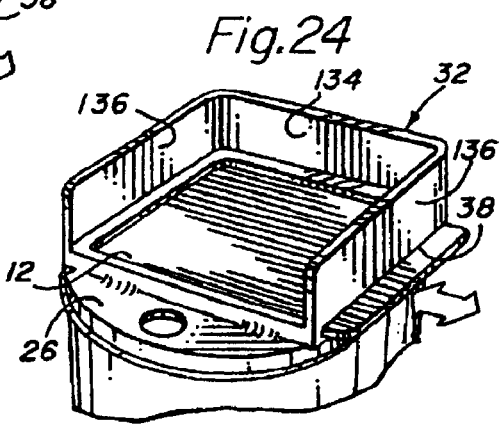
FIG. 24 illustrates an embodiment in which the lens frame is provided with a light shield.

FIG. 24 shows yet another embodiment of the present invention in which the holder 32 for removably receiving the image display 12 is positioned on the top of the lid 26 of a drinking container displaced from the fluid aperture 30 so that the images on the display are sequentially displayed to user as the container is tipped and the user's viewing angle changes. The holder or frame 32, again, is shown as generally rectangular having opposite sidewalls 136 and end wall 134 which receive and retain the display. A slot 38 in one end is provided so that the display in the form of a card may be inserted and removed as desired.

To further enhance the image presented to the user, the end wall 134 and the opposite sidewalls 136 project upwardly well above the surface of the display. The frame and the integral side walls can be molded from plastic. The purpose of the upwardly extending walls 134, 136 is to provide a light shield to minimize the deleterious effect that ambient lighting may have on viewing the image. The holder and sidewalls can be fabricated to have the appearance of an object such as a computer or television monitor.

Figure 25:
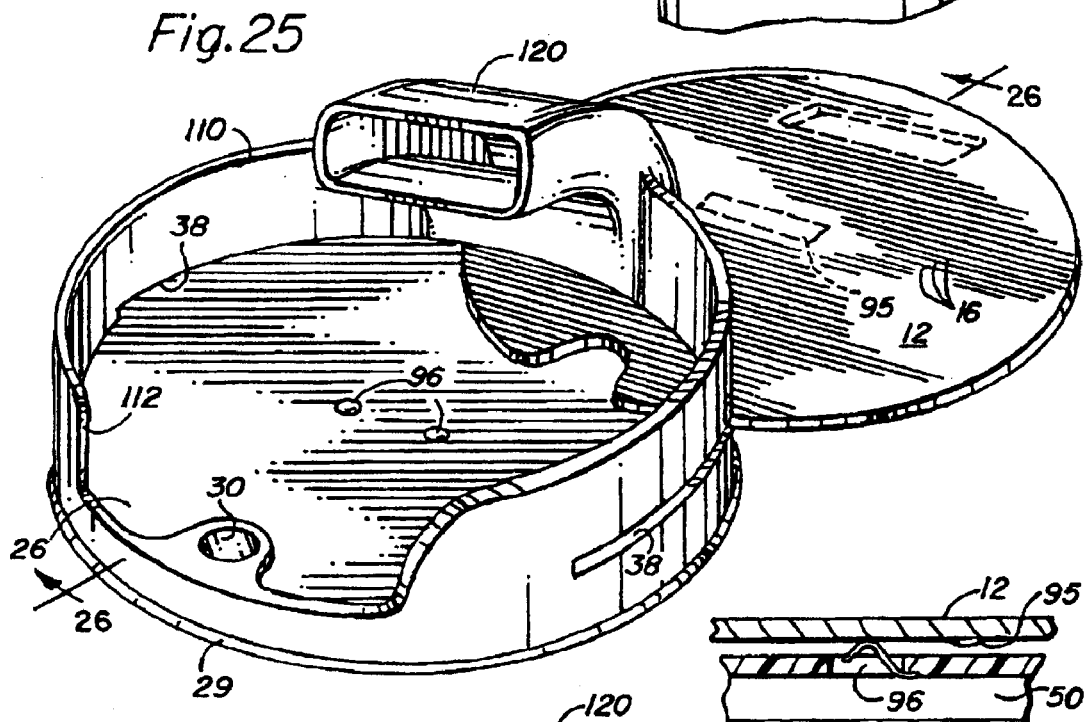
FIG. 25 is a perspective view of a beverage cup lid adapted for removably receiving a lenticular display, the cup lid having a light shield and sound transmitting tunnel.
Figure 27:
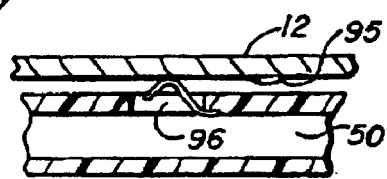
FIG. 27 is a detail view as indicated in FIG. 26.
Figure 26:
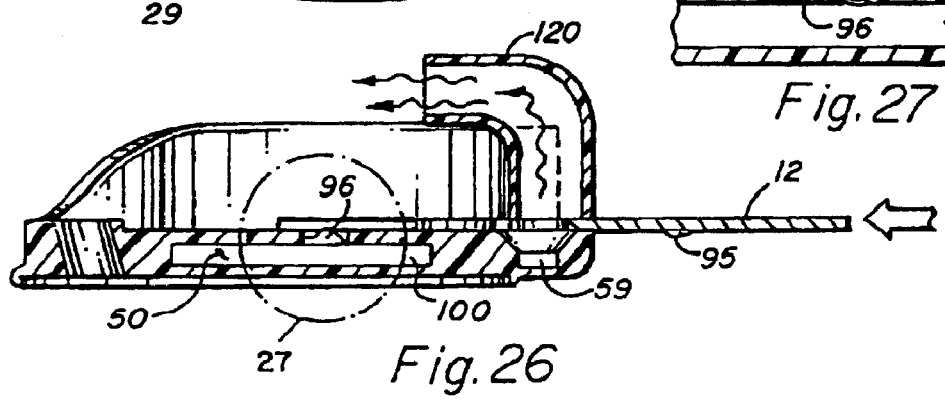
FIG. 26 is a cross-sectional view taken along line 26—26 of FIG. 25.

In FIGS. 25 to 27, yet another embodiment of the present invention is shown. In this embodiment, the image-bearing display 12 is shown as being generally circular having a series of lenticules 16 which will display various images to the user as the position of the card relative to the viewer is shifted. The image display is shown as being generally circular having a small electrical conductive element 95 on its bottom surface. The holder defines a slot 38 into which a display can be inserted. The receptacle is shown as a generally circular lid 26 with a lip 29 which is attached to a consumer item such as a beverage cup. The flange includes a fluid aperture 30 for drinking.

The lid also houses an electronic audio circuit 50 as described above. The electronic audio circuit 50 includes a digitally pre-programmed chip 100, speaker 59, power source and a sequential audio switch which may be of the type as described in FIGS. 13, 14, 17 or 19. Insertion of the display into the slot will cause the contact 95 on the bottom of the display to displace the contact switch 96 energizing the audio component 50. When the image display 12 is removed from the slot in the holder, the power to the electronic circuit is interrupted thus saving the batteries.

It will be noted that the circular sidewall 10 is raised above the surface of the image-bearing display, extending approximately 300° around the top. The area immediately adjacent the fluid aperture is recessed at 112 so as to not to present a visual obstruction to the user.

In addition, a sound transmitting channel 120 is provided at the rear of the holder. The sound transmitting channel extends upwardly and forwardly so that the sound emitted from the speaker 59 at the lower end of the channel 120 will be acoustically amplified and transmitted upwardly and directed forwardly toward the user. Thus, sound being delivered toward the user will provide a greater and clearer impact, enhance the acoustic quality and has an aesthetically ("cool"), pleasing effect.

Referring to FIGS. 28 to 31, another embodiment is shown in which a beverage container 28 has a wall 128. The upper edge of the wall forms a lip 31 which reserves the edge 29 of lid 26. The lid has a drinking aperture.

The top surface of the lid is provided with a lenticular display 12 which may be integrally formed as part of the lid or may be inserted in a holder, such as holder 32, previously described.

The lid and container are provided with registration means so that the proper orientation of the lid relative to the container is established. The upper edge of the container is provided with an L-shaped bayonet slot 131. The lid is provided with an extending tab 126 which is engageable in the slot 131 to properly position the lid.

The image display 12, when the lid is in proper position, is in registry with graphics 130 on the container wall. In this way, the graphics on the cup and the lenticular image can be coordinated for enhanced visual impact and effect.

Accordingly, it will be seen that the present invention presents a visual and/or audio visual device which may be used with consumer products such as beverage containers to present an image and sound to deliver information or a message to the user and to enhance enjoyment of using the particular product. While the optical system of the present invention has been described primarily for use in connection with drinking cups, it will be apparent that there are numerous applications for the invention.

It will be obvious to those skilled in the art to make various changes, alterations and modifications to the invention described herein. To the extent such changes, alterations and modifications do not depart from the spirit and scope of the appended claims, they are intended to be encompassed therein.

I claim:

1. A visual display device for use with a beverage container of the type having an upper open end enclosed by a lid having a fluid aperture, said device comprising:

(a) a lenticular display including at least two images viewable at first and second viewing angles; and (b) a holder secured to the container lid for orienting said display in a position relative to the container and fluid aperture whereby said images are sequentially displayed to the user as the user manipulates the container in the normal course of accessing the contents via the fluid aperture.

2. The visual display device of claim 1 wherein said holder is removably secured to said lid.

3. The visual display device of claim 2 wherein the holder comprises a frame having a slot therein for removably receiving said display.

4. The visual display device of claim 2 wherein the display is a generally rectangular card-like structure.

5. The visual display device of claim 3 wherein said holder includes upstanding side walls defining a glare shield.

6. The visual display device of claim 1 wherein said holder is integrally formed as part of said lid.

7. The visual display device of claim 6 wherein said holder is generally circular and wherein said holder has cooperating retention means for releasably securing said visual display device to said lid.

8. The visual display device of claim 1 further including audio means for generating an audio output synchronized with position of the article and the image displayed.

9. The visual display device of claim 8 wherein said audio means includes a power source, microphone, microprocessor and switch.

10. The visual display device of claim 9 wherein said audio means is associated with one side of said display.

11. The visual display device of claim 9 wherein said switch includes a displaceable contact which progressively activates the audio means to broadcast a sequence of audible sounds as the container is tilted.

12. The visual display device of claim 1 further including means for illuminating said display.

13. The visual display device of claim 1 further including means for imparting motion to said display.

14. The visual display device of claim 1 further including means for illuminating said display.

15. The visual display device of claim 1 further including means for imparting motion to said display.

16. The visual display device of claim 1 wherein said holder has registration means for orienting it relative to the container in a use position.

17. The visual display device of claim 16 wherein said container is provided with graphics located to visually coordinate with the lenticular display when in a use position.

18. The visual display device of claim 1 wherein said holder defines multiple viewing windows.

* * * * *